(12) United States Patent
Gilinsky

(10) Patent No.: US 8,091,018 B2
(45) Date of Patent: Jan. 3, 2012

(54) METHOD AND SYSTEM FOR CREATING AND IMPLEMENTING DYNAMIC GRAPHIC MEDIA

(75) Inventor: Norman L. Gilinsky, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1202 days.

(21) Appl. No.: 10/172,085

(22) Filed: Jun. 13, 2002

(65) Prior Publication Data

US 2003/0233616 A1    Dec. 18, 2003

(51) Int. Cl.
*G06F 17/00* (2006.01)
(52) U.S. Cl. ......... 715/212; 715/201; 345/619; 345/636
(58) Field of Classification Search .................. 715/500, 715/522, 502–503, 509–510, 211, 255–256, 715/273, 275, 212, 835–840, 201; 345/619, 345/625, 629, 636
See application file for complete search history.

(56) References Cited

U.S. PATENT DOCUMENTS

| | | | | |
|---|---|---|---|---|
| 5,341,293 A | * | 8/1994 | Vertelney et al. | 715/530 |
| 5,367,609 A | * | 11/1994 | Hopper et al. | 704/278 |
| 5,898,430 A | * | 4/1999 | Matsuzawa et al. | 715/500.1 |
| 6,108,674 A | * | 8/2000 | Murakami et al. | 715/515 |
| 2001/0051962 A1 | * | 12/2001 | Plotkin | 707/522 |
| 2002/0116421 A1 | * | 8/2002 | Fox et al. | 707/526 |
| 2002/0133430 A1 | * | 9/2002 | Coomber et al. | 705/27 |
| 2003/0001983 A1 | * | 1/2003 | Nose | 349/61 |
| 2003/0139840 A1 | * | 7/2003 | Magee et al. | 700/133 |
| 2004/0070793 A1 | * | 4/2004 | Lech et al. | 358/403 |
| 2004/0162821 A1 | * | 8/2004 | Buckwalter et al. | 707/3 |

OTHER PUBLICATIONS

'Using Paradox 5 for windows', special edition, QUE, 1994, pp. 62-83.*

* cited by examiner

*Primary Examiner* — Amelia Rutledge
(74) *Attorney, Agent, or Firm* — Perkins Coie LLP

(57) ABSTRACT

A computer-implemented method and system for creating and implementing dynamic clip art images in a software module. Clip art images are typically static in nature and cannot be modified by a user. This limitation with conventional clip art images makes them inflexible and inefficient. In contrast, a dynamic clip art image can be used to represent several similar static clip art images. Those elements of the similar static images that are distinct can be represented by dynamic properties that can be customized by a user. Dynamic clip art images can be modified by a user while inserted in an electronic document thereby eliminating the need to locate new static clip art images to replace existing static images in a document.

5 Claims, 8 Drawing Sheets

Creating a Dynamic Image

Converting a Static Image

810

| Actions | Action | Menu | Prompt | Checked | Disabled |
|---|---|---|---|---|---|
| 1 | NOT("Actions.Action") | IF(Actions.Action,"Open Mailbox","Close Mailbox") | "" | 0 | 0 |
| 2 | NOT("Actions.Action[2]") | IF(Actions.Action[2],"Raise Flag","Lower Flag") | "" | 0 | 0 |

820

| Geometry 1 | | | | | | | |
|---|---|---|---|---|---|---|---|
| Geometry1.NoFill | FALSE | Geometry1.NoLine | FALSE | Geometry1.NoShow | Actions.Action | Geometry1.NoSnap | FALSE |
| Name | X | Y | A | B | C | D | E |
| 1 MoveTo | Width*0.0606 | Height*0 | | | | | |
| 2 LineTo | Width*0 | Height*0.1 | | | | | |
| 3 LineTo | Width*0.6667 | Height*1 | | | | | |
| 4 LineTo | Width*1 | Height*0.4 | | | | | |
| 5 LineTo | Width*0.8485 | Height*0.2 | | | | | |
| 6 LineTo | Width*0.6061 | Height*0.65 | | | | | |
| 7 LineTo | Geometry1.X1 | Geometry1.Y1 | | | | | |

850

| Geometry 1 | | | | | | | |
|---|---|---|---|---|---|---|---|
| Geometry1.NoFill | FALSE | Geometry1.NoLine | FALSE | Geometry1.NoShow | NOT(Actions.Action[2]) | Geometry1.NoSnap | FALSE |
| Name | X | Y | A | B | C | D | E |
| 1 MoveTo | Width*0 | Height*0 | | | | | |
| 2 EllipticalArcTo | Width*1 | Height*0 | Width*0.5 | Height*1 | 0 deg. | Width/Height*0.3328 | |
| 3 LineTo | Geometry1.X1 | Geometry1.Y1 | | | | | |

FIG. 8

METHOD AND SYSTEM FOR CREATING AND IMPLEMENTING DYNAMIC GRAPHIC MEDIA

TECHNICAL FIELD

The present invention is generally directed to clip art images commonly used in creating electronic documents. More specifically, the present invention provides a method and system for creating dynamic clip art images that are more flexible than conventional static clip art images.

BACKGROUND OF THE INVENTION

Many users of computing devices often have a need for clip art. Clip art is a general term used to describe prepared static images typically stored as a jpeg or bitmap file. With the growing popularity of the Internet and World Wide Web, the availability and use of clip art has become commonplace. There are many resources accessible on the Web where a user can download clip art for free or for a fee. Clip art is also available as a feature in many software modules, such as word processing software and drawing software. These software modules typically offer a finite library of common images that users can select and insert into their electronic work products. Clip art is desirable because, instead of creating one's own electronic image, it is often easier to use a prepared piece of clip art.

The popularity of clip art is based, in part, on the facility with which it can be used. Generally, one piece of clip art is stored in an individual file. The electronic files that contain clip art can be easily selected from a resource offering clip art and inserted into the user's document. Thus, someone with little computer training can locate clip art images and incorporate them into another electronic document or webpage.

One problem with conventional clip art is that it is static. That is, each image is stored as an electronic file and cannot be changed easily. The static nature of clip art requires a separate file to be stored for each variety of an image. One example that illustrates the problem is a page-a-day calendar. Although the calendar image for each day is largely the same, because the day and the date change with each day, 366 separate clip art files must be stored to create a calendar for a year. Thus, the static nature of clip art results in an inefficient use of memory and can affect the performance of the computing device displaying the clip art.

Furthermore, modifying a piece of static clip art is inefficient because the image itself cannot be revised. Instead, the static clip art file must be removed from the electronic document and a new clip art file must be located and inserted in its place. This replacement process also can be hindered in that libraries of clip art are not always readily accessible.

One example of an improvement in static clip art is an animated GIF (graphics interchange format) file. An animated GIF contains a set of static images that are displayed rapidly in a specific order giving the image the appearance of animation. However, animated GIFs are limited to the relatively few images stored in the file and do not provide the user with a flexible and dynamic image that can be varied to suit the user's needs.

In view of the foregoing, there is a need in the art for a system and method to implement dynamic clip art images. Specifically, there is a need for a single dynamic clip art image that can take the place of several static clip art images. A dynamic clip art image can be modified by a user to look like one of the plurality of static images it represents. There is also a need to be able to modify an image in an electronic document without removing the image and replacing it.

SUMMARY OF THE INVENTION

The present invention is generally directed to a method and system for creating and implementing dynamic clip art images. Dynamic clip art images are an improvement over static images because of the increased flexibility and efficiency they provide. A single file containing a dynamic clip art image can take the place of multiple similar static clip art images. The dynamic properties also allow a user to modify a dynamic clip art image while it is in the electronic document. The foregoing embodiment of the invention is described as implemented in a software module with drawing functionality. Alternative embodiments of the present invention can be implemented in other types of software modules, such as word processing, publishing, and web page design applications.

In one aspect, the invention comprises a method for replacing a plurality of static clip art images with a dynamic clip art image. The dynamic clip art image is created and implemented in a software module with a drawing component, such as a drawing software module. A developer can draw the common elements of the plurality of static clip art images using the drawing software module. The common elements are the static portions of the ultimate dynamic clip art image. The dimensions and position of the common elements are also defined in a spreadsheet that the drawing software module uses to control and display the dynamic image. The developer can implement the elements that vary among the static clip art images as dynamic properties in the dynamic clip art image. The developer can define dynamic properties and the various settings of the properties in the spreadsheet associated with the dynamic image.

In another aspect, the invention comprises a method for creating a dynamic image using a software module such as a drawing software module. A developer can draw the static elements of the dynamic clip art image using the software module. As the static elements are drawn, the software module populates an associated spread sheet with dimension and position data. The developer also can create dynamic properties in the spreadsheet associated with the dynamic clip art image. The dynamic properties can comprise various settings for a user to choose from in modifying a dynamic clip art image. The dynamic properties can also allow the user to input text into the dynamic clip art image. Once the dynamic clip art image is completely defined in the associated spread sheet, the developer can store the image in the drawing software module for use by a user.

In yet another aspect, the present invention comprises a method for converting an existing static clip art image to a dynamic clip art image. A developer can import the existing static clip art image into the drawing software module where she can decompose the image into static and variable elements. The static elements of the existing clip art image can become the static elements of the dynamic clip art image. The developer can also define the variable elements as dynamic properties in the spreadsheet associated with the dynamic clip art image. Lastly, the developer stores the static elements and the dynamic properties together as a single dynamic clip art image in the drawing software module.

In yet another aspect, the present invention comprises a method for a user to implement a dynamic clip art image available in a software module. A user can select a desired dynamic clip art image from a library of images. The user can also select a dynamic property within the image and choose one of the settings for the dynamic property or input data for the dynamic property. The software module then displays the dynamic image with the selected dynamic property for use in an electronic document.

These and other aspects of the invention will be described in the detailed description in connection with the drawing set and claim set.

BRIEF DESCRIPTION OF THE DRAWINGS

FIG. 8 illustrates representative displays of spread sheets used to control the dynamic images shown in FIG. 7.

DETAILED DESCRIPTION OF THE EXEMPLARY EMBODIMENTS

Figure 1:
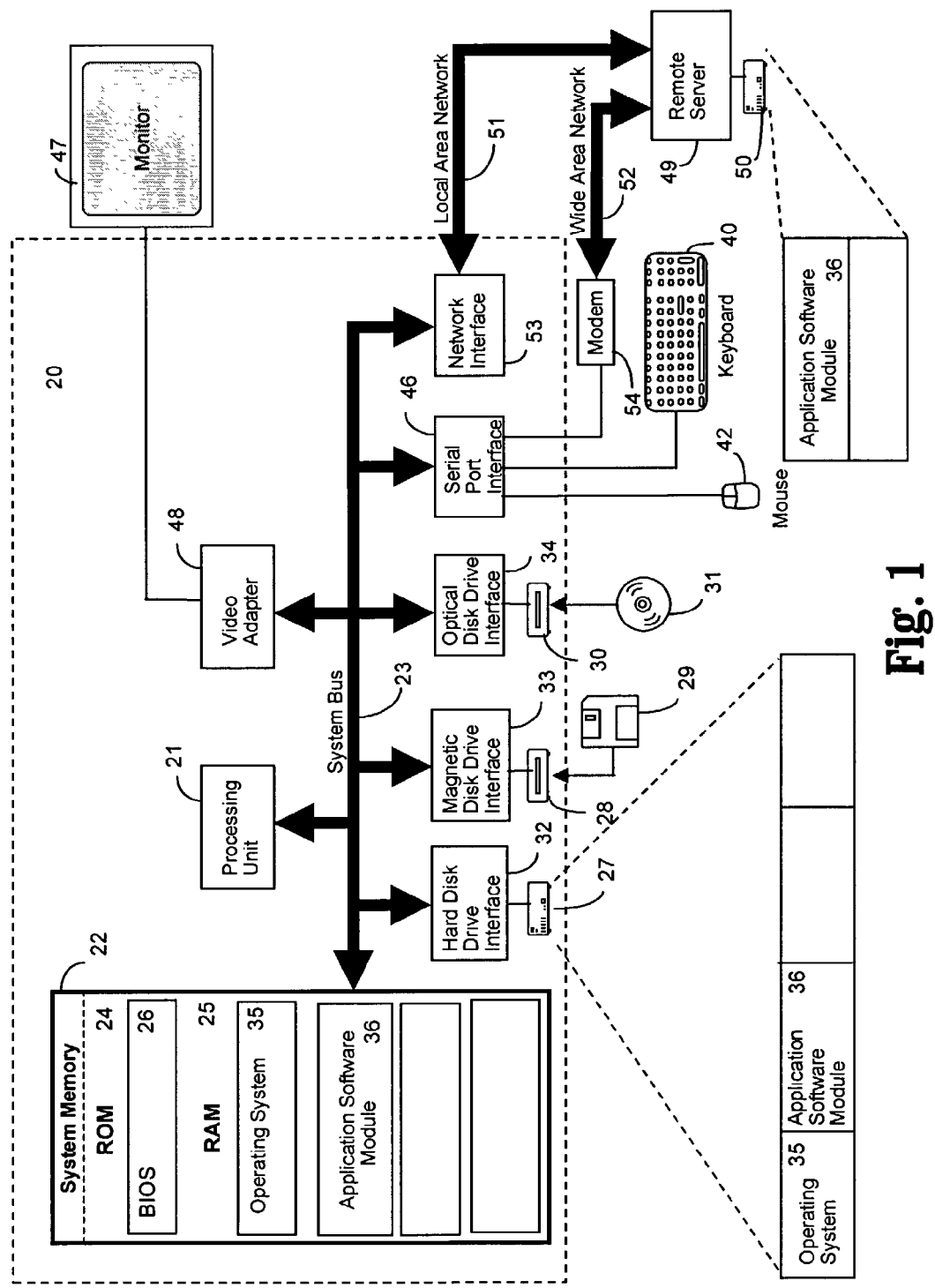
FIG. 1 is a functional block diagram illustrating the operating environment for an exemplary embodiment of the present invention.

The present invention provides an improved approach to implementing clip art images in electronic documents. Specifically, the present invention takes advantage of the common attributes and characteristics of a plurality of static clip art images to create a single dynamic clip art image. The dynamic clip art image comprises static elements for those pieces of the static images that are common. Where the static images diverge, dynamic properties are implemented that allow a user to customize the dynamic image as desired. In the embodiment described herein, the dynamic images are implemented in a software module with a drawing component. However, dynamic images can also be implemented in other types of software modules, such as word processing, publishing, and web page design applications.

Although the exemplary embodiments will be generally described in the context of a software module and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including processing units, memory storage devices, display devices and input devices. These processes and operations may utilize conventional, computer components in a distributed computing environment, including remote file servers, remote computer servers, and remote memory storage devices. Each of these conventional distributed computing components is accessible by a processing unit via a communications network.

The processes and operations performed by the computer include the manipulation of signals by a processing unit or remote server and the maintenance of these signals, within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention includes a computer program which embodies the functions described herein and illustrated in the appended display screens and flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer program will be explained in more detail in the following description in conjunction with the remaining figures illustrating the program flow.

Referring now to the drawings, in which like numerals represent like elements throughout the several figures, aspects of the present invention and the preferred operating environment will be described.

FIG. 1 illustrates various aspects of an exemplary computing environment in which the present invention is designed to operate. Those skilled in the art will appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 20 suitable for supporting the operation of the preferred embodiment of the present invention. As shown in FIG. 1, the personal computer 20 operates in a networked environment with logical connections to a remote computer 49. The logical connections between the personal computer 20 and the remote computer 49 are represented by a local area network 51 and a wide area network 52. Those of ordinary skill in the art will recognize that in this client/server configuration, the remote computer 49 may function as a file server or computer server.

The personal computer 20 includes a processing unit 21, such as "PENTIUM" microprocessors manufactured by Intel Corporation of Santa Clara, Calif. The personal computer also includes system memory 22, including read only memory (ROM) 24 and random access memory (RAM) 25, which is connected to the processor 21 by a system bus 23. The preferred computer 20 utilizes a BIOS 26, which is stored in ROM 24. Those skilled in the art will recognize that the BIOS 26 is a set of basic routines that helps to transfer information between elements within the personal computer 20. Those skilled in the art will also appreciate that the present invention may be implemented on computers having other architectures, such as computers that do not use a BIOS, and those that utilize other microprocessors.

Within the personal computer 20, a local hard disk drive 27 is connected to the system bus 23 via a hard disk drive interface 32. A magnetic disk drive 28, which is used to read or write a floppy disk 29, is connected to the system bus 23 via a magnetic disk drive interface 33. An optical drive 30, such as a CD-ROM or DVD drive, which is used to read an optical disk 31, is connected to the system bus 23 via an optical disk drive interface 34. A user enters commands and information into the personal computer 20 by using input devices, such as a keyboard 40 and/or pointing device, such as a mouse 42, which are connected to the system bus 23 via a serial port interface 46. Other types of pointing devices (not shown in FIG. 1) include track pads, track balls, pens, head trackers, data gloves and other devices suitable for positioning a cursor on a computer monitor 47. The monitor 47 or other kind of display device is connected to the system bus 23 via a video adapter 48.

The remote computer 49 in this networked environment is connected to a remote memory storage device 50. This remote memory storage device 50 is typically a large capacity device such as a hard disk drive, CD-ROM or DVD drive, magneto-optical drive or the like. Those skilled in the art will understand that program modules, such as an application program module 36, are provided to the remote computer 49 via computer-readable media. The personal computer 20 is connected to the remote computer 49 by a network interface 53, which is used to communicate over the local area network 51.

In an alternative embodiment, the personal computer 20 is also connected to the remote computer 49 by a modem 54, which is used to communicate over the wide area network 52, such as the Internet. The modem 54 is connected to the system bus 23 via the serial port interface 46. The modem 54 also can be connected to the public switched telephone network (PSTN) or community antenna television (CATV) network. Although illustrated in FIG. 1 as external to the personal computer 20, those of ordinary skill in the art can recognize that the modem 54 may also be internal to the personal computer 20, thus communicating directly via the system bus 23. It is important to note that connection to the remote computer 49 via both the local area network 51 and the wide area network 52 is not required, but merely illustrates alternative methods of providing a communication path between the personal computer 20 and the remote computer 49.

Although other internal components of the personal computer 20 are not shown, those of ordinary skill in the art will appreciate that such components and the interconnection between them are well known. Accordingly, additional details concerning the internal construction of the personal computer 20 need not be disclosed in connection with the present invention.

Those skilled in the art will understand that program modules, such as an operating system 35 and an application software module 36, and data are provided to the personal computer 20 via computer-readable media. In the preferred computer, the computer-readable media include the local or remote memory storage devices, which may include the local hard disk drive 27, floppy disk 29, CD-ROM or DVD 31, RAM 25, ROM 24, and the remote memory storage device 50. In the preferred personal computer 20, the local hard disk drive 27 is used to store data and programs.

Figure 2:
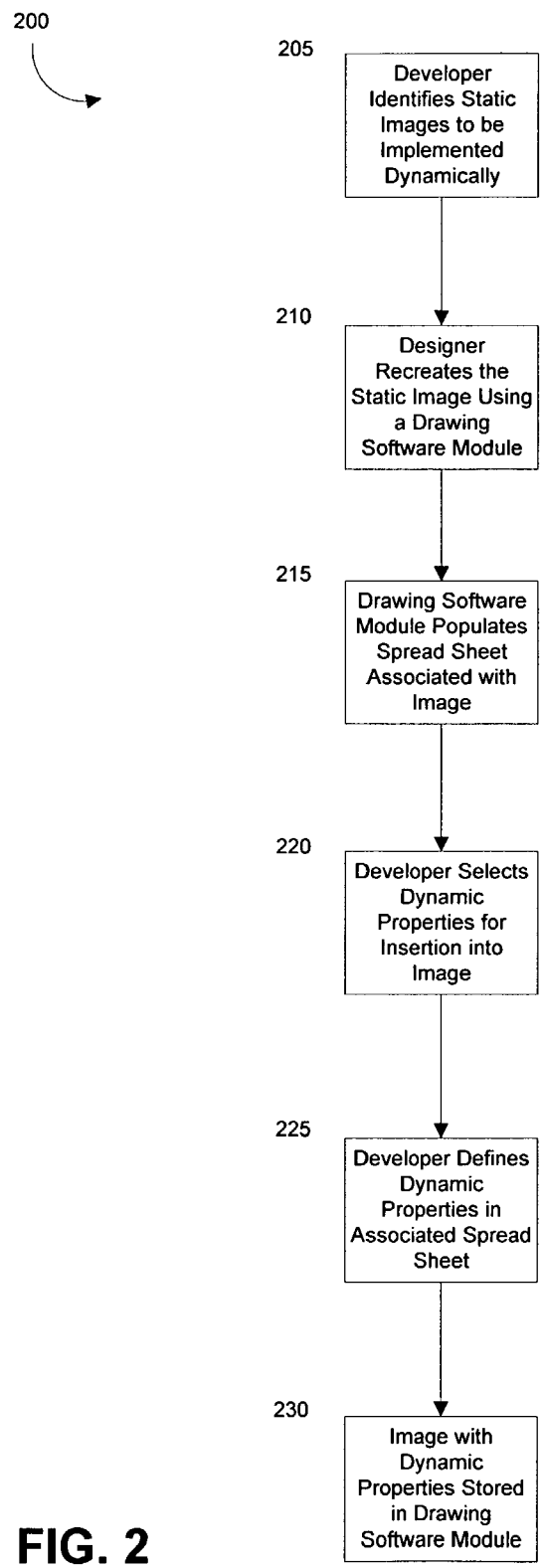
FIG. 2 is a logic flow diagram illustrating a process for creating a dynamic image in accordance with an exemplary embodiment of the present invention.

Referring to FIG. 2, an exemplary process 200 is illustrated for creating a dynamic image for use in a drawing software module 36. In this example, not only is the dynamic image used in the drawing software module 36, but the drawing software module 36 is also the development environment for the dynamic image. In alternative embodiments of the invention, the dynamic image can be developed in one software environment and implemented in another software environment. Regardless of where the dynamic image is created, the advantage of a dynamic image is greater flexibility and efficiency as compared to more cumbersome static images. When using static images, every variation of a static image must be stored as a separate image typically in a separate file. However, the single dynamic image can take the place of several similar static images. The dynamic element provides the portion of the image that varies between the static images.

Figure 5:
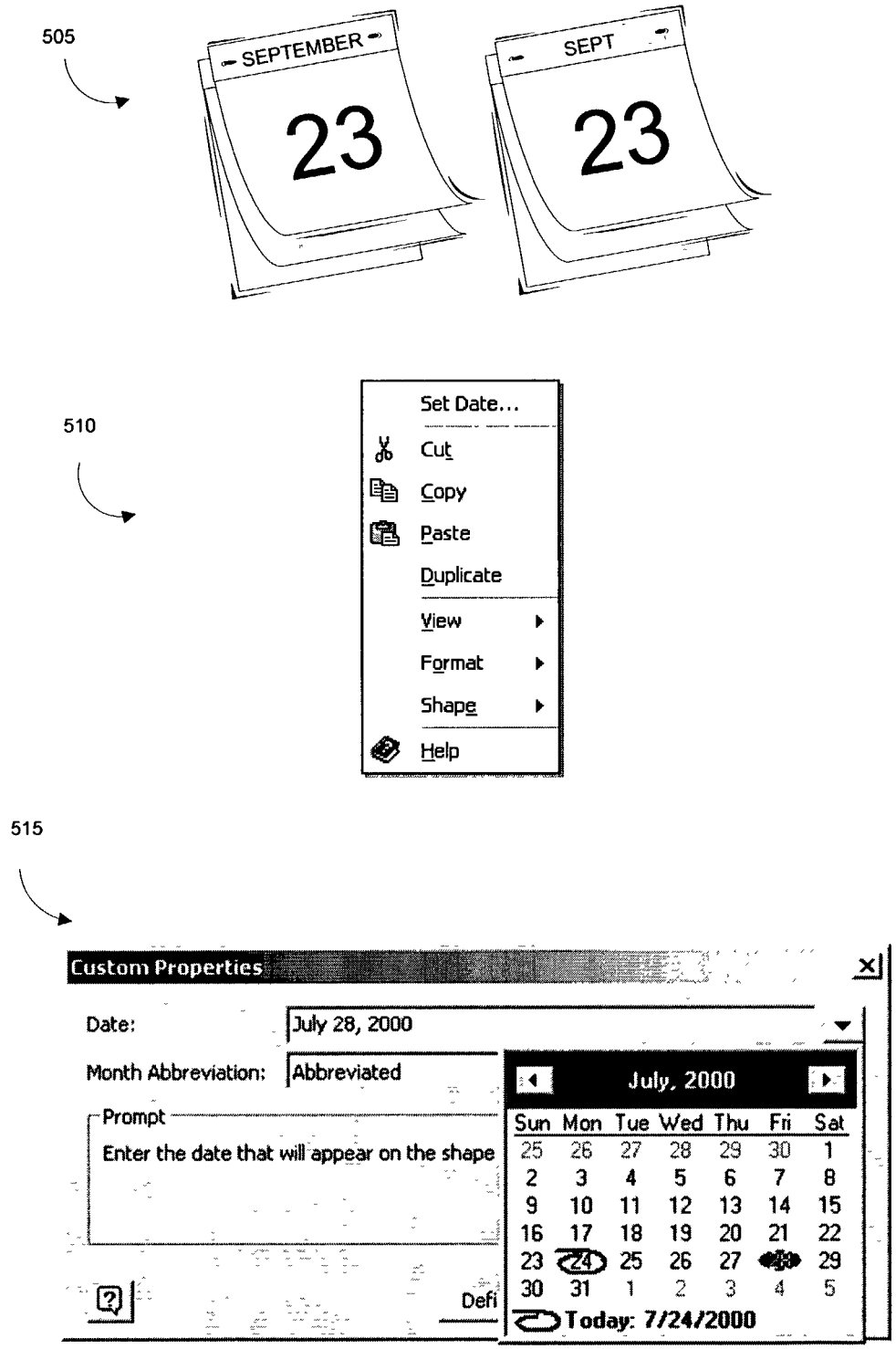
FIG. 5 illustrates representative displays for a user to select a setting for a dynamic property associated with an image of a calendar.

One example that illustrates the benefits of dynamic images is the calendar image 505 illustrated in FIG. 5. For a software module to display such a calendar with every day of the year, 366 separate files of static images would be required. However, a single file with a dynamic calendar image can replace all of those files of static images. Using the menu 510 and the custom property settings available in window 515 a user can create any day of the year with the single dynamic image.

In step 205 of process 200, a developer first identifies a plurality of similar static images that can be represented as a single dynamic image. The developer, as referred to herein, can represent a single person or multiple people involved in the development of dynamic images. In step 210, a developer using the drawing software module 36 can recreate the static portions of the image. In the exemplary embodiment described herein, the drawing software module uses a spreadsheet format associated with the drawing to define the geometry, position, and presentation of the drawing within the software module 36. Although the spreadsheet generally is not visible to the end user, the spread sheet is the means by which a developer can create content for use in the drawing software module. Exemplary spreadsheets 820 and 850 in FIG. 8 are used by an exemplary drawing software module to create images of mailboxes 705 in FIG. 7. When a designer draws an image, the drawing software module 36 automatically populates the spreadsheet with the dimension and position data of the drawn image in step 215. The designer can also add enhancements by further defining the image in the spreadsheet.

Figure 7:
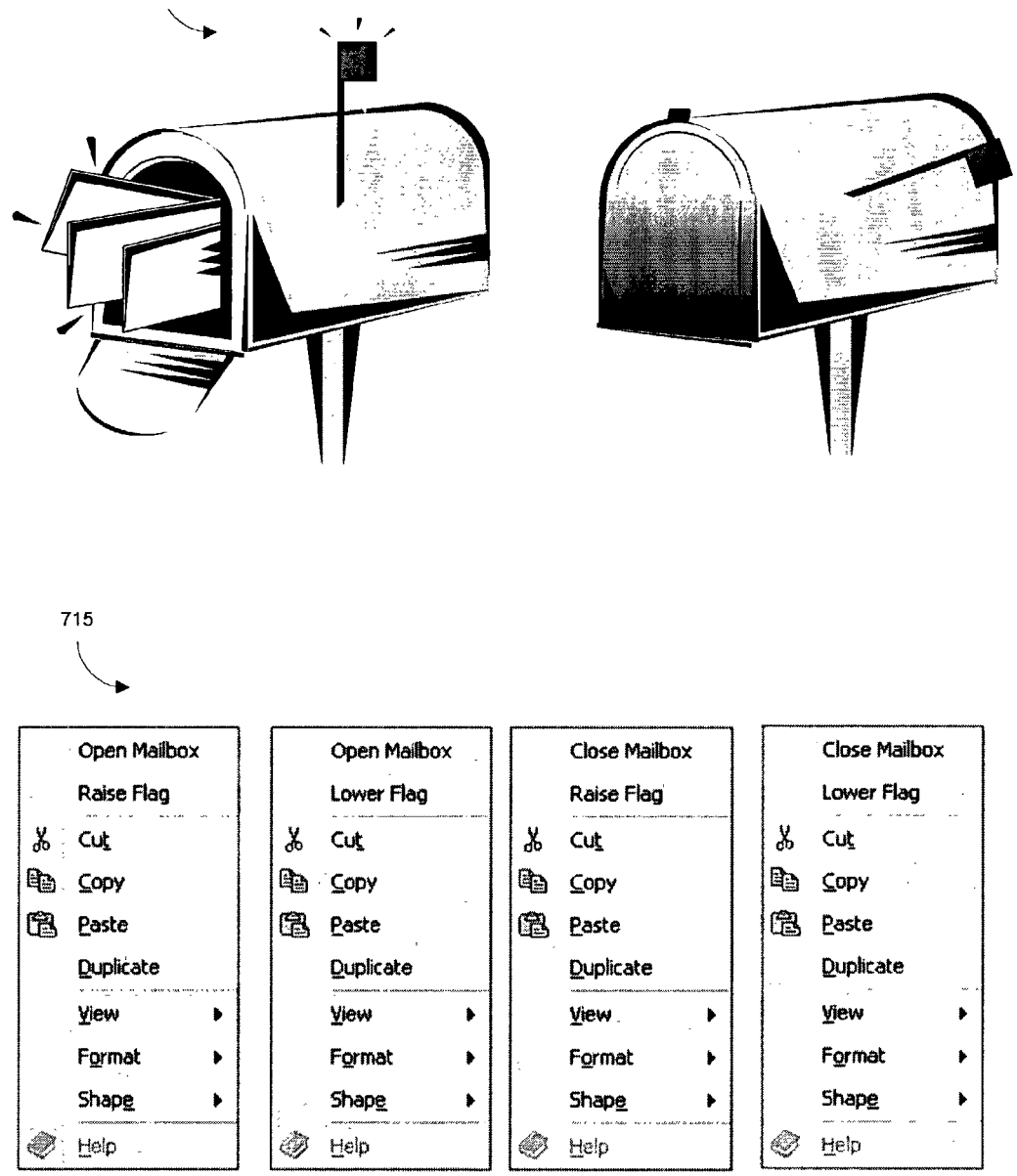
FIG. 7 illustrates representative displays of a dynamic image and the menu displayed to a user for selecting various settings of the dynamic properties.

In step 220, the developer can select particular dynamic properties to insert into the image that she has drawn. The two dynamic properties associated with the exemplary mailbox image 705 illustrated in FIG. 7 are the mailbox door and the flag on the side of the mailbox. In the mailbox example, each dynamic element has two states for the user to choose from. The developer can define the dynamic properties of the image in step 225. Spreadsheet 810 in FIG. 8 illustrates a representative method for defining the two dynamic properties of the mailbox image 705. Once the developer has completed defining how the dynamic properties will behave within the image, the drawing software module 36 stores the image with the associated dynamic properties in step 230 for testing and ultimate implementation in the drawing software module.

Figure 3:
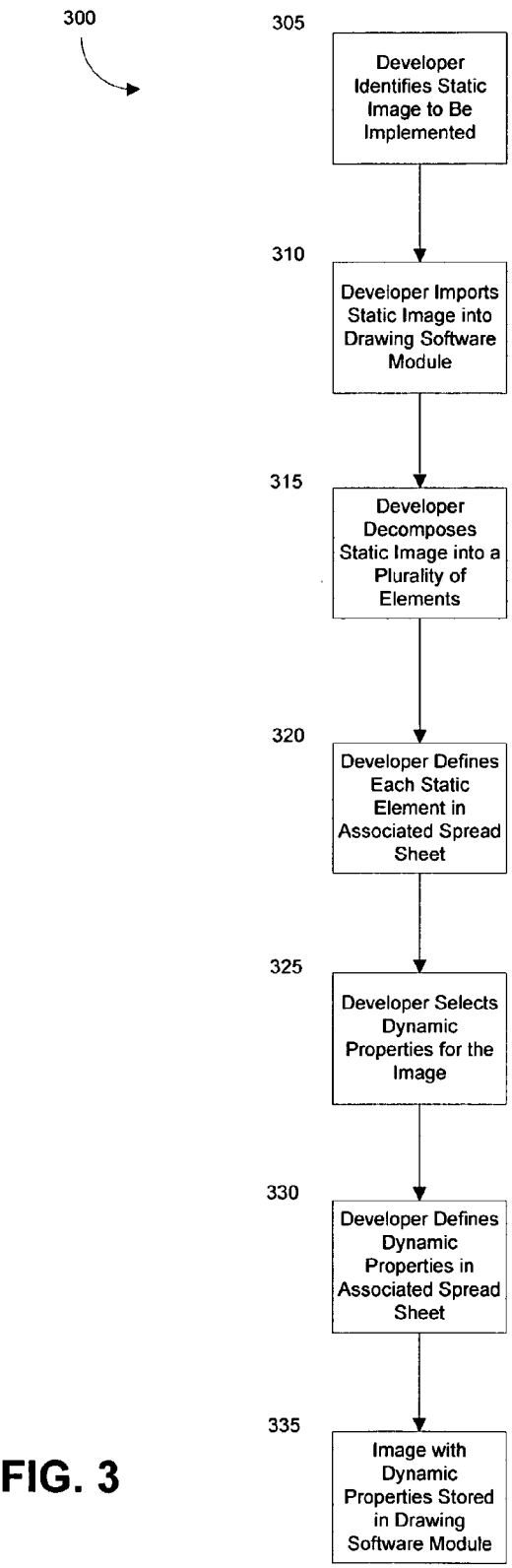
FIG. 3 is a logic flow diagram illustrating a process for converting a static image to a dynamic image in accordance with an exemplary embodiment of the present invention.

In an alternative embodiment of the present invention, a developer may import a static image into a drawing software module and convert it to a dynamic image for storing within the drawing software module. An exemplary process 300 for converting a static image to a dynamic image is illustrated in FIG. 3. In step 305, the developer identifies a static image that she would like to convert to a dynamic image for use in the drawing software module 36. In step 310, the developer imports the static image into the drawing software module for further development. In step 315, the developer decomposes the static image into a plurality of static elements. For example, referring to FIG. 6, the static elements would be the airplane image and the banner. The static elements are recycled and used in creating the dynamic image. The dynamic element is the text that is shown within the boundaries of the banner. Decomposing a static image can be performed with functions commonly available in many software modules.

Figure 6:
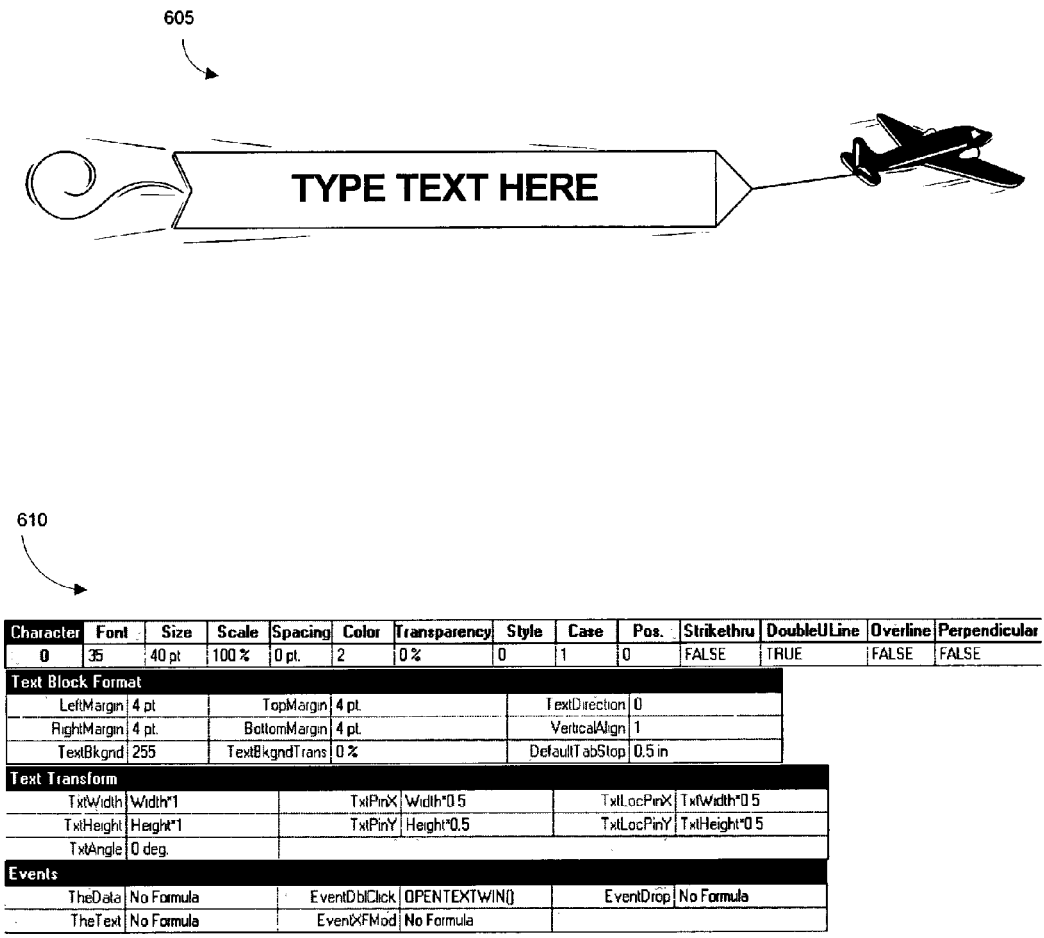
FIG. 6 illustrates representative displays of a dynamic image and the spread sheet for controlling the dynamic properties of the image.

In step 320, the developer defines each static element of the new image in an associated spreadsheet such as the representative spreadsheets 820 and 850 shown in FIG. 8. Typically, each static element of the image has its own spread sheet with dimensions and data for positioning the element. In step 325, the developer selects the dynamic properties for the image. In the example shown in FIG. 5, the dynamic properties are the name of the month and the date show on the calendar. In the example illustrated in FIG. 6, a dynamic property is the text that is inserted in the banner. Another dynamic property that can be associated with 605 in FIG. 6, are the dimensions of the banner. Typically, the dimensions would be manipulated by the user with control handles (not shown in FIG. 6) displayed in the dynamic image. In step 330, the developer can define the dynamic properties in a spreadsheet associated with the image. An exemplary spreadsheet 610 for defining text for insertion into a dynamic image is illustrated in FIG. 6. In the exemplary spreadsheet 610 the developer can control the format and size of text inserted in the banner in 605. However, the user chooses the text or symbols that are inserted into the banner. Finally, in step 335, the image elements and any associated dynamic properties are stored together as a single dynamic image in the drawing software module.

Figure 4:
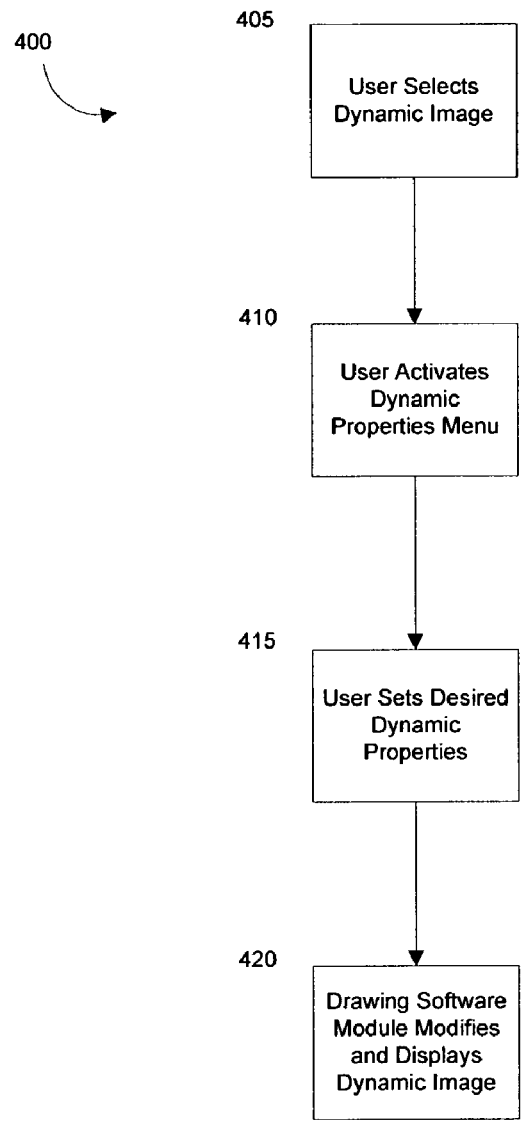
FIG. 4 is a logic flow diagram illustrating a process for a user to implement a dynamic image in accordance with an exemplary embodiment of the present invention.

FIG. 4 illustrates an exemplary process 400 for a user to use a dynamic image in a software module. The software module may be a drawing software module as described above or another type of software module that can implement images in an electronic document. Drawing software modules typically provide a, library of various images that a user can select from to insert in an electronic document. In step 405, the user selects a dynamic image from the library of available images. For example the user may select the mailbox image 705 illustrated in FIG. 7. In step 410, the user can activate a menu showing the dynamic properties associated with the image. The menu can be activated in a variety of ways such as using a pointing device to double click on the image. In the example of the mailbox shown in FIG. 7 a menu, such as the exemplary menu in 715, will be displayed to provide the user with options for selecting the dynamic properties.

In step 415, the user can set the dynamic properties to the desired states. For example, in FIG. 7 the user can choose to have the mailbox door either open or closed. The user can also select whether to have the flag in the raised or lowered position on the mailbox image. User selections are implemented in the actions spreadsheet 810 in FIG. 8 and control the display of the mailbox image.

In step 420, the drawing software module modifies the dynamic image according to the selections made by the user and displays the dynamic image. As shown in FIG. 8, the dynamic properties from action spreadsheet 810 can be referenced in the geometry spreadsheets 820 and 850 that control the dynamic image. Therefore, a dynamic property selection by the user that is implemented in the action spreadsheet 810 also affects the geometry spreadsheets 820 and 850 for the image. As such, a variety of pictures can be implemented with a dynamic image instead of having to save each variation of the picture as a separate static image.

In conclusion, the present invention enables and supports a more flexible and efficient approach to implementing clip art images in electronic documents. The present invention utilizes common characteristics among a plurality of static clip art images to create a single dynamic clip art image. The dynamic clip art image can be used to represent each of the similar static clip art images. The dynamic clip art image comprises the common elements of the static clip art images as well as dynamic components that can be adjusted to represent the variations in the static clip art images. In some examples, a user can select various settings for the dynamic properties in order to create the various clip art images that are represented by the dynamic clip art image. In other cases, such as the banner advertisement, the user chooses and inputs the text that is desired. Working with a single dynamic image, as opposed to several static images, facilitates the implementation of a variety of images in an electronic document.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalents thereof. For instance, the sequence of steps for creating the static and variable components of a dynamic image can vary in other embodiments of the invention. Furthermore, the system and method described herein can be applied to dynamic images used in other software modules beyond the drawing field, such as word processing, publication, and web page design applications.

What is claimed is:

1. A method in a computer system having a display device for creating and rendering a dynamic image stored on the computer system as a first file, comprising:

generating, by a software drawing module, static instructions for drawing a static element of a dynamic image, the static element not varying when the dynamic image is rendered, the static instructions defining the geometry, position, and presentation of the static element;

storing in the first file the static instructions for drawing the static element;

generating first dynamic instructions for drawing a first state of a dynamic element corresponding to a portion of the dynamic image, the first dynamic instructions defining the geometry, position, and presentation of the first state of the dynamic element;

storing in the first file the first dynamic instructions for drawing the dynamic element in the first state;

generating second dynamic instructions for drawing a second state of the dynamic element corresponding to the portion of the dynamic image, the second state being different from the first state, the second dynamic instructions defining the geometry, position, and presentation of the second state of the dynamic element;

storing in the first file the second dynamic instructions for drawing the dynamic element in the second state so that the first file stores the static instructions, the first dynamic instructions, and the second dynamic instructions of the dynamic image;

storing, in a spreadsheet associated with the dynamic image, a list of available states for the dynamic element, the list of available states comprising the first state and the second state;

providing a second file storing a document;

adding the dynamic image to the document by inserting the static instructions, the first dynamic instructions, and the second dynamic instructions of the first file into the second file storing the document;

displaying a menu showing an indication at least one state for the dynamic element, the displaying comprising accessing the spreadsheet storing the list of available states;

receiving a first selection of the first state for the dynamic image of the document;

after receiving the first selection, rendering on a display device the static element drawn in accordance with the static instructions stored in the second file and the dynamic element drawn in accordance with the first dynamic instructions stored in the second file;

receiving a second selection of the second state for the dynamic image; and after receiving the second selection, rendering on the display device the static element drawn in accordance with the static instructions stored in the second file and the dynamic element drawn in accordance with the second dynamic instructions stored in the second file.

2. The method of claim 1, further comprising:

updating the state of the displayed dynamic element after the static instructions, the first dynamic instructions, and the second dynamic instructions of the first file have been inserted into the second file storing the document; and displaying the dynamic image on the display device with the updated state.

3. The method of claim 1 wherein the document is selected from the group consisting of a word processing document, a drawing, a web page, and a publication.

4. The method of claim 1, further comprising:

identifying a common element of a first static image and a second static image, wherein the static element corresponds to the identified common element.

5. The method of claim 4 wherein the static instructions comprise at least one ellipticalarcto instruction and wherein at least one static instruction has an associated coordinate.

* * * * *